United States Patent [19]

Vogt

[11] Patent Number: 4,667,371

[45] Date of Patent: May 26, 1987

[54] METHOD AND APPARATUS FOR MECHANICALLY EXCLUDING THE BREASTBONE OF LIVESTOCK CARCASSES

[75] Inventor: Norman H. Vogt, Lewiston, Mich.

[73] Assignee: C. A. Pemberton & Co. Limited, Toronto, Canada

[21] Appl. No.: 876,121

[22] Filed: Jun. 19, 1986

[51] Int. Cl.$^4$ ............................................. A22B 5/20
[52] U.S. Cl. ...................................... 17/52; 17/23; 83/370
[58] Field of Search ................ 17/23, 54, 52; 83/365, 83/370

[56] References Cited

U.S. PATENT DOCUMENTS

| | | | |
|---|---|---|---|
| 3,916,484 | 11/1975 | Kennedy | 17/23 X |
| 4,118,777 | 10/1978 | Wallace | 17/23 X |
| 4,246,837 | 1/1981 | Chenery | 83/370 X |
| 4,601,083 | 7/1986 | Shoji et al. | 17/54 |

*Primary Examiner*—Willie G. Abercrombie
*Attorney, Agent, or Firm*—Fetherstonhaugh & Co.

[57] ABSTRACT

A mechanical method for splitting the breastbone of hog carcasses comprises the steps of determining, by means of a sensor device, the length of the carcass by determining the distance between a datum plane and the snout of the carcass. The cutting of the carcass is then initiated, by means of a remote controlled cutting hit point on the carcass that is located at a distance from the datum plane that is a function of the length of the carcass. The length of the cut from the hit point to a cut termination point on the carcass is controlled as a function of the length of the carcass as determined by the position of its snout. The breast splitter comprises a snout height sensor for determining the length of the suspended carcass by determining the distance between the datum plane and its snout. A detector is provided for detecting the positioning of the selected suspended carcass at a control point along the path of the overhead conveyor. A robotic cutter is provided. The robotic cutter has a cutter blade and a manipulator mounting the cutter blade for movement along a controlled path which initially extends from an initiation point toward the carcass to contact the carcass at a hit point and then extends downwardly along a cutting stroke. A programmable controller communicates with the snout height sensor and the position detector to receive and is programmed to process the signals it receives to generate command signals which are indicative of the height of the hit point and the length of the cutting stroke required to split the breastbone without damaging the vital organs of the carcass. The controller communicates with said robotic cutter means to transmit the command signals to the manipulator.

5 Claims, 3 Drawing Figures

1

METHOD AND APPARATUS FOR MECHANICALLY EXCLUDING THE BREASTBONE OF LIVESTOCK CARCASSES

This invention relates to the splitting of the breastbone of livestock carcasses. In particular, this invention relates to a method and apparatus for mechanically splitting the breastbone of livestock carcasses by means of a remote controlled cutter blade.

PRIOR ART

The breastbone of livestock such as hogs, cattle, sheep and horses is a large bone which must be cut lengthwise to provide two sides of dressed meat of substantially equal proportion. In the known livestock carcass processing lines, the splitting of the breastbone of the livestock carcass is normally a manual operation in which an operator using a hand-held power saw determines the required hit point by visually inspecting the carcass and based on practical experience, initiates the cutting operation at the visually determined hit point. This type of manual operation requires considerable physical strength and durability on the part of the operator.

Careful location of the hit point at which the cut is initiated and the cut termination point is important because if an error is made, the operator can cut some of the vital organs and in so doing may render the carcass unfit for subsequent processing. Because the manual process presently used is very taxing, there is an increased likelihood of damage to the carcass as the operator tires. Furthermore, if the operator tires, the productivity decreases and the entire kill line can slow down.

Livestock carcasses such as the carcasses of hogs, cattle, horses, sheep or the like are not uniform in size or length and as a result, the appropriate hit point at which the cutting of the breastbone should be initiated will vary depending upon the size of the carcass. Because the determination of the hit point is extremely important in order to avoid damage to the vital organs, it has been generally accepted that this process would be difficult to mechanize.

In the known livestock carcass processing lines, it is customary to suspend the livestock carcasses by their hind legs on hangers which are driven along an overhead conveyor to move through the various processing stations including the breastbone splitting station.

The breastbone of a hog is not a prominent feature of a hog carcass and as a result, hog carcasses are particularly difficult to work with because of the difficulty in sighting the hit point and the termination point.

I have found that the critical hit point at which the cutting of the breastbone should be initiated can be determined by initially determining the distance between the datum plane of the hanger from which the carcass is suspended and the nose of the suspended carcass. For any one species of hog, the distance between its nose or snout and the hit point can be calibrated such that the distance between the datum plane and the snout is a function of the distance between the datum plane and the hit point. Again, in order to avoid damage to the vital organs, it is necessary to vary the length of the cut depending upon the size of the carcass. By detecting the distance between the datum plane and the nose, I am able to determine the size of the carcass and thereby determine the required length of cut.

SUMMARY OF INVENTION

It is an object of the present invention to provide a simple and efficient mechanized method and apparatus for splitting the breastbone of livestock carcasses.

It is a further object of the present invention to provide a mechanized method and apparatus for splitting the breastbone of livestock carcasses in which the hit point at which the cut is initiated is determined by sensing the position of the nose in relation to a datum plane.

According to one aspect of the present invention, there is provided a mechanical method for splitting the breastbone of successive livestock carcasses which are suspended by their hind legs, head down from hangers suspended from an overhead conveyor, the hangers being movable along the overhead conveyor through a breastbone splitting station at a fixed height with respect to a datum plane such that each carcass has a readily detectable low end portion, the height from the datum plane to the lower end point varying according to the size of the carcass, comprising the steps of determining, by means of a sensor device, the length of a selected carcass by determining the distance between the datum plane and the lower end point of the selected carcass, initiating, by means of a remote controlled cutting device, the cutting of the selected carcass at a hit point on the selected carcass that is located at a distance from the datum plane that is a function of the length of the carcass as determined by the position of the lower end point as determined by the sensor device, controlling the length of the cut from the hit point to to a cut termination point on the carcass as a function of the length of the carcass as determined by the position of its lower end point as determined by the sensor device.

According to a further aspect of the present invention, there is provided a breast splitter for use in a breastbone splitting station of a livestock carcass processing line in which hog carcasses are suspended by their hind legs, head down from hangers which are continuously driven along an overhead conveyor in a predetermined path that extends in a datum plane through the splitting station, such that the lower end point of the carcasses projects downwardly, the height from the lower end point to the datum plane varying according to the size of the carcasses comprising lower end point height determining means for determining the length of a selected suspended carcass by determining the distance between the datum plane and its lower end point and generating a first signal which is indicative of the determined height of the carcass, detector means for detecting the positioning of the selected suspended carcass at a control point along the path of the overhead conveyor and generating a second signal that is indicative of the fact that the selected carcass is at said control point, robotic cutter means having a cutter blade and manipulator means mounting the cutter blade for movement along a controlled path which initially extends from an initiation point toward the carcass to contact the carcass at a hit point and then extends downwardly along a cutting stroke that extends along the breastbone of the selected carcass to a termination point and then laterally away from the carcass and then returns to the initiation point, while simultaneously moving longitudinally with the carcass while in contact with the carcass.

The invention will be more clearly understood after reference to the following detailed specification read in conjunction with the drawings wherein.

Figure 1:
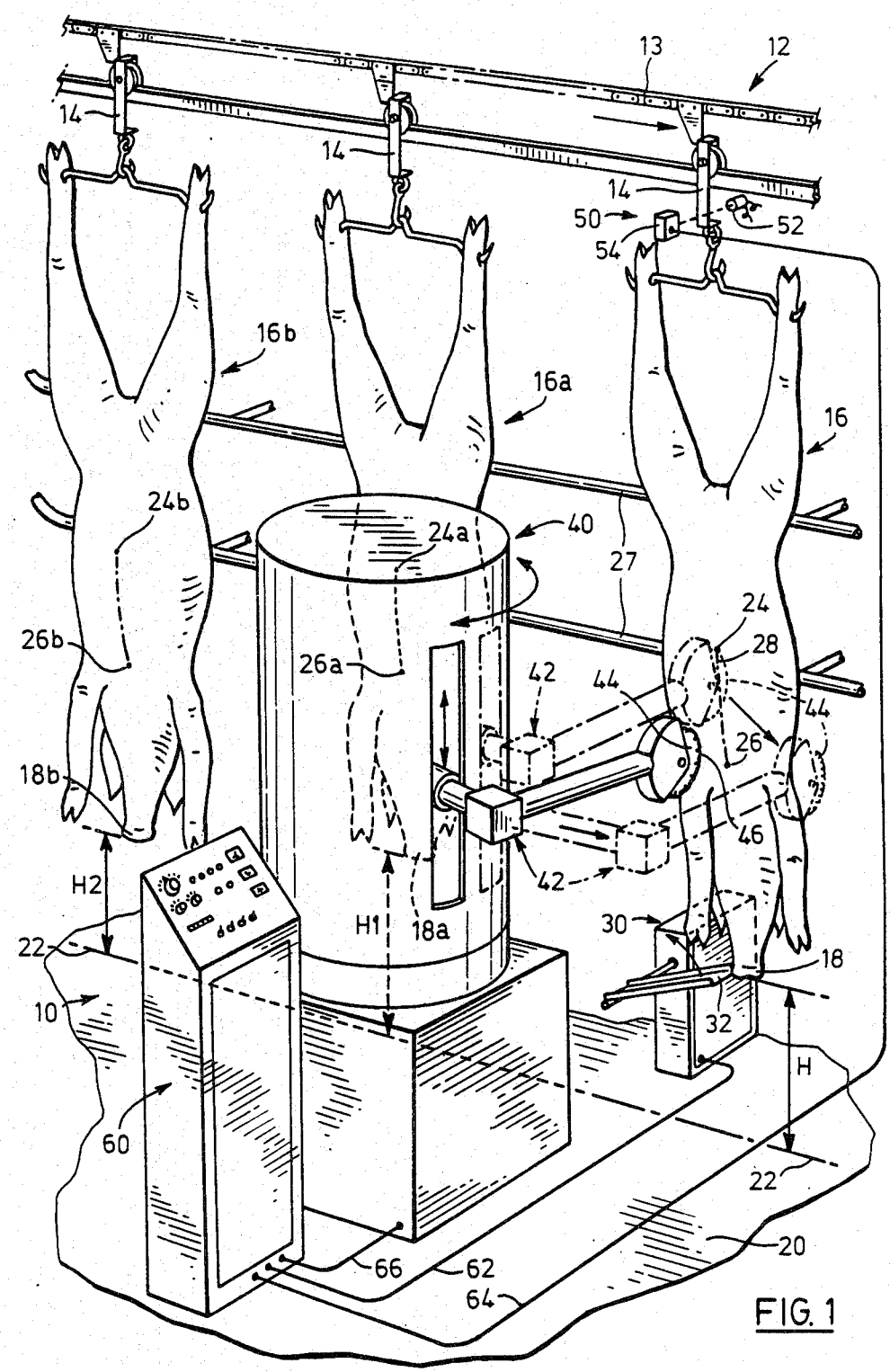
FIG. 1 is a diagrammatic representation of a breastbone splitter for hog carcasses constructed in accordance with an embodiment of the present invention.

With reference to FIG. 1 of the drawings, the reference numeral 10 refers generally to a breastbone splitter station of a hog processing line according to an embodiment of the present invention. The hog processing line has an overhead conveyor 12 from which a plurality of hangers 14 are suspended. The hangers 14 are continually driven along the overhead conveyor 12 by a suitable chain drive 13. As shown in FIG. 1 of the drawings, the conveyor 12 and the floor 20 above which the conveyor extends, are both horizontal, the plane of the floor or the plane of the overhead conveyor can function as a datum plane. I prefer for simplicity to use the plane 22 of the floor as the datum plane.

As shown in FIG. 1 of the drawings, carcasses 16, 16a and 16b of different length, are each suspended from hangers 14 and because of the different length, their noses or snouts 18, 18a and 18b will extend to be located at different heights, H, H1 and H2 above the datum plane 22.

Because of the different size of the carcasses 16, 16a and 16b, the hit points 24, 24a and 24b will be located at different heights above the datum plane 22. Likewise, the termination point 26, 26a and 26b will be located at different heights above the datum plane 22 depending upon the size of the carcass.

I have found that it is possible to accurately determine the appropriate hit point 24 and termination point 26 for any carcass of a particular species by calibrating hogs of various carcass sizes for the particular species and that the hit point and termination point for any species can be established as a function of the length of the carcass and that I can accurately determine the length of the carcass by determining the distance between the snout of the carcass and a datum plane which in the preferred embodiment is the datum plane 22. The location of the hit point is selected so as to be close to the upper end of the breastbone and the location of the termination point is selected so as to be only a short distance below the end of the breastbone. These points are the same points which have previously been determined by an experienced operator by visual sighting and touch. Having determined the position of the hit point 24 and the termination point 26, I have also determined the length of the cutting stroke required to cut the carcass along the cut line 28 which extends between the hit point 24 and the termination point 26.

In order to determine the height of the snout 18 above the datum plane 22, I provide a sensor device 30 which has a movable sensing blade 32 which is positioned to extend into the path of travel of the snout of the carcasses as they move toward the cutting station. The blade 32 is deflected by contact with the snout 18 of the carcass until the snout passes over the blade 32. The extent to which the blade 32 is deflected by this contact is measured and this measurement is used to generate a signal which is indicative of the height H which is the distance from the datum plane 22 to the plane of the snout. This first signal is therefore a function of the suspended length of the hog carcass.

The depth of the cut is important in order to avoid damage to the vital organs. Generally, it is more dangerous to cut too deep than too shallow. The depth of the cut is limited by the proportions of the cutter blade cover 47 which limits the extent to which the cutting blade can project into the meat. The depth of the cut can be easily adjusted by adjusting the extent to which the blade projects from the cover 47 in a conventional manner.

Figure 3:
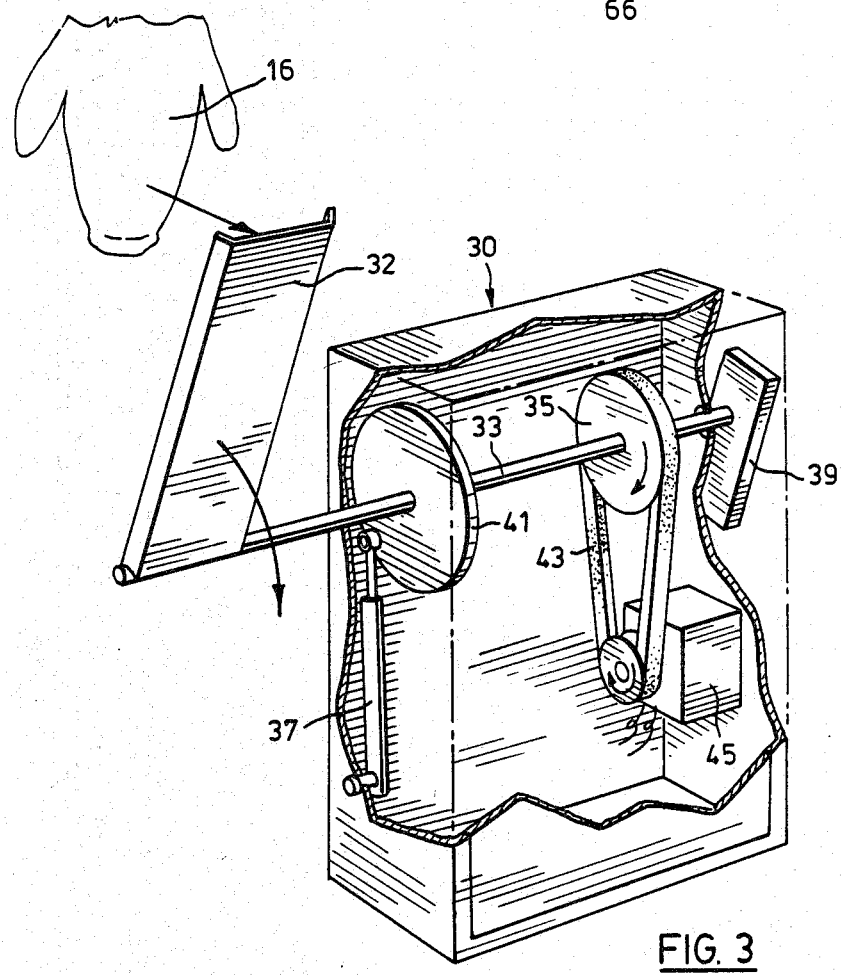
FIG. 3 is a diagrammatic representation of the sensor device of FIG. 1.

A suitable sensor device 30 is illustrated in FIG. 3 wherein it will be seen that the blade 32 projects radially from a shaft 33 which is mounted for rotation in opposite side walls of a housing 37. A counter balance weight 39 is mounted on the shaft 33 and serves to normally urge the blade 33 to a substantially upright position. A damper assembly 41 cooperates with the shaft 33 and serves to dampen the oscillations of the blade 32 when it is deflected by contact with the carcass or is returning to the upright position. A puller 35 is mounted on the shaft 33 for rotation therewith. The pulley 35 is connected by means of a belt 43 to a shaft encoder 45 which translates the angle of rotation of the blade 32 to a height measurement signal which is communicated to the controller.

For the purposes of cutting the hog, I provide a robotic cutter mechanism 40 which has a manipulator mechanism 42 which supports a rotary cutter blade 44 for movement along a controlled cutting path which initially extends from an initiation point 46 toward the hit point 24 and then extends downwardly along the cut line 28 to the termination point 26 and then extends laterally away from the carcass to return to the initiation point 23. Movement along the cutting path is carried out as the carcass 16 is continuously moved along the conveyor and consequently the movement of the cutter blade is also controlled in order to compensate for movement of the carcass through the cutting station. Restraining bars 27 extend through the cutting station, behind the carcasses and serve to prevent movement of the carcasses away from the cutter as it is advanced into contact with the carcasses.

Robotic mechanisms suitable for performing this cutting operation are readily available and one such industrial robot is manufactured by Cincinnati Milacron Inc. of Cincinnati, Ohio and is identified as a T3-360 series Industrial Robot. The T3-360 Industrial Robot is an electrically driven, computer controlled, three axis robot which has two linear axes and one rotary axis.

For the purposes of determining when the movement of the cutter blade from the initiation point 46 should commence, I provide a detector 50 which serves to detect the positioning of the selected suspended carcass at a control point along the path of the overhead conveyor. The detector 50 generates a second signal which is indicative of the fact that the foremost carcass has reached the control point. The sensor means 50 includes a light transmittor 52 and a light sensitive receiver 54 which are spaced from one another and between which an advancing portion of the suspension assembly passes to interrupt the passage of light therebetween to generate the second control signal.

A programmable controller generally identified by the reference numeral 60 is provided for the purposes of controlling the operation of the robotic cutter means in response to the signals generated by the sensor device 30 and the detector device 50. The programmable controller is a symultaneous controller which is computable with the T3-360 Robot and is also sold by Cincinnati Milacron Inc. as a controller for use with its Industrial Robots. The computer controller provides variable three-axis positioning of the cutter between taught points with an optional wrist axis for four-axis control. The controller interprets each instruction and applies the proper signals to the axis drivers. The programmable controller is connected through input lines 62 and 64 to the sensor 30 and detector 50 respectively to receive the first and second signals. The programmable controller 60 is programmed to process the first and second signals to generate command signals which are a function of the length and position of the carcass and are indicative of the position of the selected carcass, the height of the hit point and the length of the cutting stroke required to split the breastbone without damaging the vital organs of the carcass having regard to the calibrated information obtained by calibrating the species of the selected hog as previously described. The controller communicates with the robotic cutter means through the line 66 so as to transmit the command signals to the manipulator to set the initial height of the cutter blade to the required hit point and to set the length of cut to that required and to cause the cutter blade to be moved longitudinally of the cutting path to compensate for movement of the carcass.

Various programs can be written without difficulty for the purposes of programming the programmable controller to obtain the required operation of the robotic controller and a specific program is not a feature of the present invention.

Figure 2:
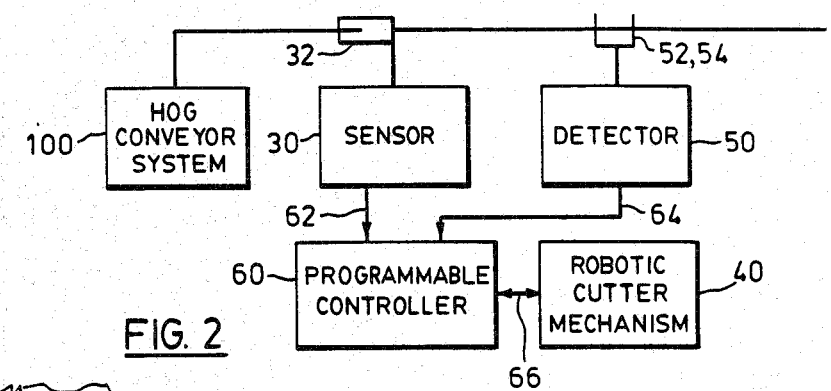
FIG. 2 is a block diagram showing the relationship between the various components of the breastbone splitter of FIG. 1.

With reference to FIG. 2 of the drawings, it will be seen that when the hog conveyor system 100 is operated, movement of hogs along the conveyor will deflect the sensor blade 32 of the sensor 30 and will also activate the detector 52, 54. The sensor through the line 62 to the programmable controller 60 and the detector 50 will transmit a signal through the line 64 to the programmable controller 60. The prgrammable controller will generate control signals which are transmitted through the line 66 to the robotic cutter mechanism 40. Feedback signals may also be transmitted from the robotic cutter mechanism 40 to the programmable controller for the purposes of monitoring the operation of the robotic mechanism.

Various modifications of the present invention will be apparent to those skilled in the art without departing from the scope of the invention. For example, the sensor device 30 may be adapted to sense the position of the lower most point of any carcass and the lower most point may be a point other than the snout of a hog carcass.

In addition, overriding manual adjustment may be provided to permit the operator to adjust the length of the cutting stroke. These and other modifications will be apparent to those skilled in the art.

I claim:

1. A mechanical method for splitting the breastbone of successive livestock carcasses which are suspended by their hind legs, head down from hangers suspended from an overhead conveyor, the hangers being movable along the overhead conveyor through a breastbone splitting station at a fixed height with respect to a datum plane such that each carcass has a readily detectable low end portion, the height from the datum plane to the lower end point varying according to the size of the carcass, comprising the steps of;
    (a) determining, by means of a sensor device, the length of a selected carcass by determining the distance between the datum plane and the lower end point of the selected carcass,
    (b) initiating, by means of a remote controlled cutting device, the cutting of the selected carcass at a hit point on the selected carcass that is located at a distance from the datum plane that is a function of the length of the carcass as determined by the position of the lower end point as determined by the sensor device,
    (c) controlling the length of the cut from the hit point to to a cut termination point on the carcass as a function of the length of the carcass as determined by the position of its lower end point as determined by the sensor device.

2. A method as claimed in claim 1, wherein the lower end point which is sensed by the sensor means is the nose of the suspended livestock carcasses.

3. A method as claimed in claim 2 wherein the carcasses are hog carcasses.

4. A breast splitter for use in a breastbone splitting station of a livestock carcass processing line in which hog carcasses are suspended by their hind legs, head down from hangers which are continuously driven along an overhead conveyor in a predetermined path that extends in a datum plane through the splitting station, such that the lower end point of the carcasses projects downwardly, the height from the lower end point to the datum plane varying according to the size of the carcasses comprising;
    (a) lower end point height determining means for determining the length of a selected suspended carcass by determining the distance between the datum plane and its lower end point and generating a first signal which is indicative of the determined height of the carcass,
    (b) detector means for detecting the positioning of the selected suspended carcass at a control point along the path of the overhead conveyor and generating a second signal that is indicative of the fact that the selected carcass is at said control point,
    (c) robotic cutter means having a cutter blade and manipulator means mounting the cutter blade for movement along a controlled path which initially extends from an initiation point toward the carcass to contact the carcass at a hit point and then extends downwardly along a cutting stroke that extends along the breastbone of the selected carcass to a termination point and then laterally away from the carcass and then returns to the initiation point, while simultaneously moving longitudinally with the carcass while in contact with the carcass.

5. A breast splitter as claimed in claim 4, for use in association with carcasses of the type in which the nose forms the lower end point and the lower end point height determining means is arranged to determine the height of the nose from the datum plane.

* * * * *